United States Patent [19]

Chun et al.

[11] Patent Number: 5,384,873
[45] Date of Patent: Jan. 24, 1995

[54] OPTICAL INTERFACE UNIT AND METHOD OF MAKING

[75] Inventors: Christopher K. Y. Chun, Gilbert; Shun-Meen Kuo, Chandler, both of Ariz.

[73] Assignee: Motorola, Inc., Schaumburg, Ill.

[21] Appl. No.: 131,175

[22] Filed: Oct. 4, 1993

[51] Int. Cl.⁶ .................................................. G02B 6/28
[52] U.S. Cl. ........................................ 385/31; 385/89; 385/88; 385/49
[58] Field of Search ............... 385/31, 14, 129, 130, 385/131, 132, 142, 143, 145, 146, 88, 89, 90, 47, 49; 264/1.1, 1.5, 1.7; 250/227.14, 227.15, 227.22

[56] References Cited

U.S. PATENT DOCUMENTS

| | | | |
|---|---|---|---|
| 4,740,259 | 4/1988 | Heinen | 385/89 X |
| 5,195,154 | 3/1993 | Uchida | 385/89 X |
| 5,249,245 | 9/1993 | Lebby et al. | 385/14 X |

Primary Examiner—John D. Lee
Assistant Examiner—Phan Thi Heartney
Attorney, Agent, or Firm—Gary F. Witting; Eugene A. Parsons

[57] ABSTRACT

A plurality of electrical traces and a light emitting device having a working portion is disposed on an interconnect substrate. A first optical portion having a first surface, a second surface, and a tapered surface is disposed onto the interconnect substrate. The first surface of the optical portion covers the working portion of the light emitting device, a second surface of the first optical portion is positioned parallel to the working portion of the light emitting device, and the tapered surface extends from the second surface toward the working portion of the light emitting device for guiding light emitted from the working portion of the light emitting device to the second surface.

21 Claims, 2 Drawing Sheets

OPTICAL INTERFACE UNIT AND METHOD OF MAKING

BACKGROUND OF THE INVENTION

This invention relates, in general, to fabrication of optical devices and, more particularly, to manufacturing and fabrication of optical interface devices.

This application is related to copending application that bears Ser. No. 07/889,335, entitled "MOLDED WAVEGUIDE AND METHOD OF MAKING SAME" filed on May 28, 1992, now U.S. Pat. No. 5,265,184 which is hereby incorporated by reference herein.

At present, optical interface devices are made using a variety of methods, such as photolithography, diffusion, ion implantation, or a combination of any of the above. Generally, these methods used for manufacturing optical interface units or devices are complex, inefficient, and are generally not suitable for high volume manufacturing. However, as use of optical interface units or devices increase, a need for a fabrication method and a structure that allows for efficient and cost effective manufacturing will be required.

Further, use of conventional methods for manufacturing optical interface devices cannot provide sufficient flexibility for manufacturing large quantities of optical interface units, thereby making optical interface units difficult to be assimilated into standard electronic circuits and electronic components. As a result, these inflexible conventional methods limit the use of optical interface devices for interconnection applications in standard electronic equipment, thus use of optical interface devices in high volume applications are severely curtailed.

Additionally, conventional methods for manufacturing optical interface devices require individual processing that is typically achieved by hand. Manufacturing optical interface devices by hand injects many problems into manufacturing, such as being extremely labor intensive, costly, and accuracy of workmanship that results in the optical interface units not being allowed to be manufactured in high volumes. Moreover, individual fabrication of optical interface units do not generally lend themselves to automated manufacturing, thus causing limited use of optical interface devices in electronic products.

It can be readily seen that conventional methods for manufacturing optical interface devices have severe limitations. Also, it is evident that conventional methods for manufacturing these optical interface devices are not only ineffective, expensive, and complex, but also do not lend themselves to high volume manufacturing environments. Therefore, a method for manufacturing optical interface units or devices in an automated effective manner would be highly desirable.

SUMMARY OF THE INVENTION

Briefly stated, an article and a method for making an optical interface unit are provided. A plurality of electrical traces and a light emitting device having a working portion is disposed on an interconnect substrate. The light emitting device is operably connected to at least one of the plurality of electrical traces. A first optical portion having a first surface, a second surface, and a tapered surface is disposed onto the interconnect substrate. The first surface of the optical portion overlays the light emitting device, the second surface of the first optical portion is positioned parallel to the working portion of the light emitting device, and the tapered surface extends from the second surface toward the working portion of the light emitting device for guiding light emitted from the working portion of the light emitting device to the second surface.

It is an advantage of the present invention to enhance alignment capability between the core region of the optical fiber and the working portion of the photonic device.

DETAILED DESCRIPTION OF THE DRAWINGS

Figure 1:
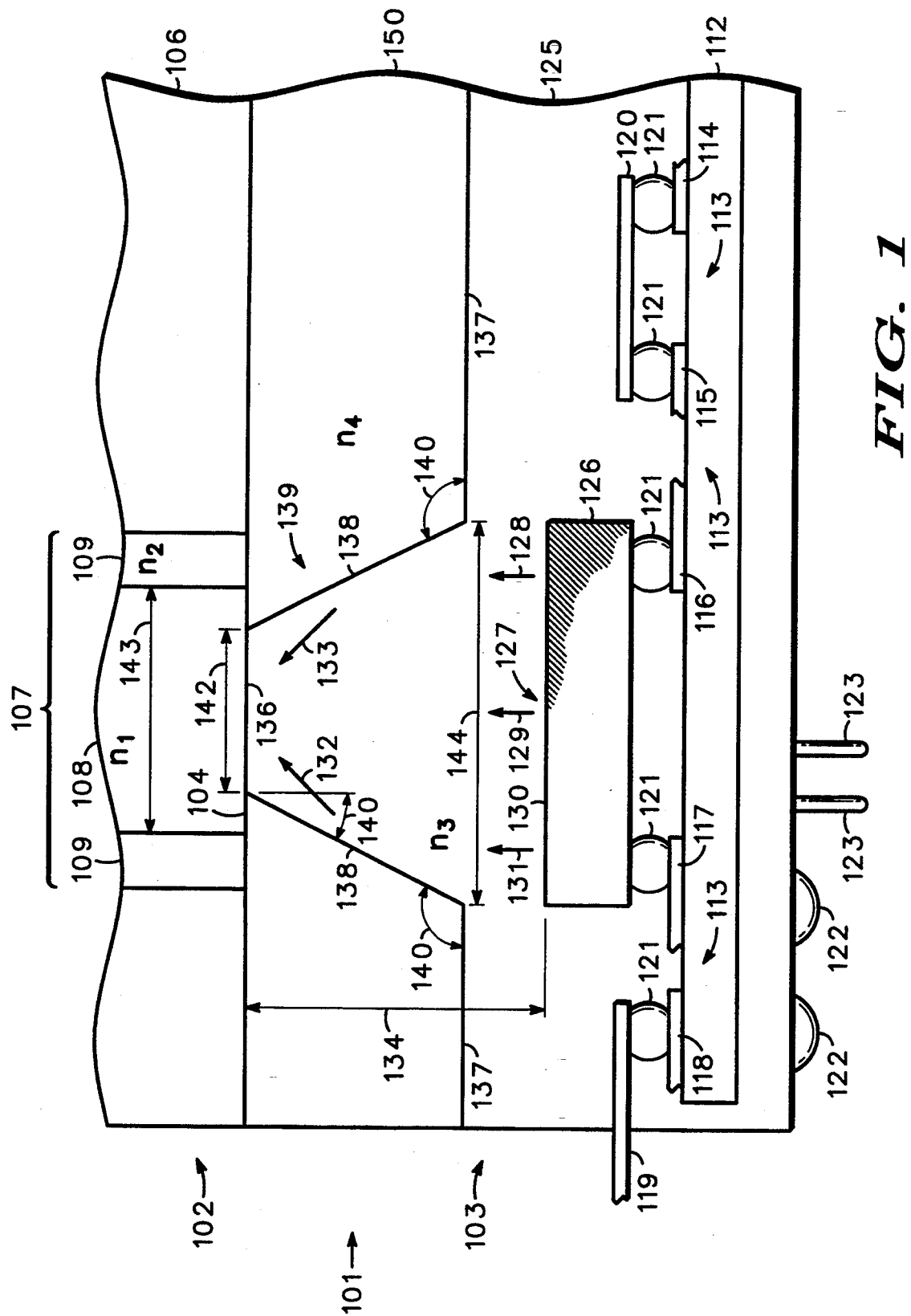
FIG. 1 is a greatly enlarged simplified sectional view of a portion of an optical interface unit.

FIG. 1 shows a greatly enlarged simplified sectional view of a portion of an optical module 101. Optical module 101 includes optical connector 102 and optical interface unit 103. Optical connector 102 includes at least one optical fiber 109 having a light conducting core region 108 and a cladding region 109. Optical module 103 includes a first optical portion 135 having a surface 136, a surface 137, and tapered surfaces 138, a plurality of electrical traces 113 disposed on an interconnect substrate 112, a light emitting device 126. It should be understood that FIG. 1 is a sectional view of a portion of optical module 101, thus optical module 101 extends both into and out of FIG. 1, as well as extending to the right of FIG. 1. It should be further understood that specific orientation of elements in FIG. 1, such as configuration of the plurality of electrical traces 113, a leadframe member 119, and an integrated circuit 120 are capable of being positioned to any suitable location on interconnect substrate 112.

Generally, interconnect substrate 112 is capable of being any suitable substrate, such as a printed circuit (PC) board, an FR4 board, a ceramic interconnect board, or the like. Since many different kinds of interconnect substrates are capable of being used for interconnect substrate 112, a simplified version of interconnect substrate 112 is illustrated in FIG. 1 so as to more clearly and more particularly point out the present invention. Typically, the plurality of electrical traces 113 are disposed on interconnect substrate 112, thereby providing conductive paths for interconnecting a variety of optoelectronic components and standard electronic components on interconnect substrate 112. Additionally, interconnect substrate 112 is capable of having multiple levels of electrical traces in interconnect substrate 112. Disposing of the plurality of electrical tracings on interconnect substrate 112 is illustrated in a simplistic format by electrical tracings 114 through 117 and a bonding pad 118.

Typically, externally derived electrical input signals going to optical interface unit 103 and electrical output signals from optical interface unit 103 are directed through any suitable electrical interconnection method, such as leadframe member 119 of a leadframe (not shown), a pin grid array (PGA) illustrated by pins 123, solder bump array illustrated by solder bumps 122, or the like. By way of example only, as illustrated in FIG. 1, leadframe member 119 electrically connects bonding pad 118 through a contact 121, thus enabling input and output of electrical signals to optical interface unit 103. It should be understood by one of ordinary skill in the art that selection of the input and output method for inputting and outputting electrical signals into optical interface unit 103 is capable of changing the specific selection of interconnect substrate 112. However, it should be further understood that selection of specific methods for inputting and outputting signals into and out of optical interface unit 103 in no way limits or interferes with the present invention.

In the present invention, a light emitting device 126, such as a light emitting diode, a laser, or the like is mounted on prepared interconnect substrate 112. Mounting of light emitting device 126 to prepared interconnect substrate 112 is achieved by any suitable method, such as bump balls 121, tab mounting, wire bonding, or the like. Preferably, positioning of light emitting device 126 on interconnect substrate 112 is achieved by an automated method that accurately places light emitting device 126 on interconnect substrate 112 so that upon bonding of light emitting device 126 to interconnect substrate 112 light emitting device 126 is accurately affixed to interconnect substrate 112.

Optical interface unit 103 having first optical portion 135 with surface 136, surface 137, and tapered surfaces 138 is formed or is disposed on at least portions of interconnect substrate 112. More specifically, surface 136 of first optical portion 135 is centrally positioned over a working portion 127 of light emitting device 126. Also, surface 136 is in a plane parallel to a surface 130 that is defined by working portion 127 of light emitting device 126. Generally, surface 136 and surface 130 define a distance 134 that operably couples optical connector 102 and photonic device 126. Distance 134 ranges between 2.0 microns to 200.0 microns. However, in a preferred embodiment of the present invention, distance 134 ranges between 5.0 microns to 50.0 microns. Tapered surfaces 138 extend from surface 136 to surface 137, thereby forming a trapezoidaly shaped light guiding structure 139 having three sides defined by surface 136 having a width 142 and tapered surfaces 138 tapering outwardly to a width 144. It should be understood that since FIG. 1 is a sectional view, light guiding structure 139 is capable of extending into and out of the drawing. However, in a preferred embodiment of the present invention, structure 139 defines a truncated cone with an upper section of the tapping cone sagittally removed by surface 136.

Generally, width 142 of surface 136 is determined in relation to diameter or width 143 of core region 108 of optical fiber 107. Typically, width 142 of surface 136 is as large as or smaller than width 143 of core region 108 of optical fiber 107, thereby not allowing any light, indicated by arrows 132 and 133, to escape and not enter core region 108. With width 142 being fixed, width 144 of first optical portion 135 determines angle 140 of tapered surface 138 with surface 137. However, it will be understood by those skilled in the art that angle 140 is set at a critical reflection angle so that tapered surface 138 internally reflect the light emitted by light emitting device 126, thus directing the light to surface 136. Typically, angle 140 ranges from 90.0 degrees to 120.0 degrees; however, specific calculation of permissible acceptable angles of angle 140 are calculated using equations found hereinbelow. Generally, width 144 is large enough so as to capture light emitted from light emitting device 126.

Functionally, light emitting device 126 emits light, illustrated by arrows 128, 129, 131. The emitted light having a component of diffraction spreads in accordance to Snell's Law. However, in the present invention, tapered surfaces 138 having width 144 and set at angle 140 reflects essentially all of the misdirected light or diffracted light from light emitting device 126 to surface 136. The emitted light is reflected off of tapered surfaces 138, illustrated by arrows 132 and 133, to surface 136, thereby directing the reflected light into core region 108 of optical fiber 107 through surface 136 of first optical portion 135.

Reflectivity enhancement of tapered surfaces 138 is achieved by forming a second optical portion 150. Second optical portion 150 is used as a cladding layer which enhances the reflectivity of tapered surface 138, thereby increasing the internal reflection off of tapered surfaces 138 and into core region 108 of optical fiber 107. Hence, increasing overall performance of tapered surfaces 138.

By way of example only, in order to maximize acceptance of emitted light, illustrated by arrows 128, 129, and 131, into core region 108 of optical fiber 107, the emitted light that strikes tapering surfaces 138 is reflected or internally reflected off of tapering surfaces 138 toward surface 136, thus reflected light, illustrated by arrows 132 and 133, is directed or guided toward surface 136. Additionally, the reflected light, indicated by arrows 132 and 133, passes through surface 136 and into core region 108 of optical fiber 107.

Generally, angle 140 approximately ranges from 90.0 degrees to 125.0 degrees in order to direct reflected light, indicated by arrows 132 and 133 into core region 108 of optical fiber 107. However, by way of example, in order to maximize the reflected emitted light from tapering surfaces 138, angle 140 or $\theta_T$ is determined from the following equation:

$$\theta_T \leq 180° - \sin^{-1}(n_4/n_3)$$

with first optical portion 135 having a refractive index of 1.5 symbolized by $n_3$ and with second optical portion 150 having a refractive index of 1.4 symbolized by $n_4$, solving for angle 140 or $\theta_T$, results in angle 140 or $\theta_T$ being less than or equal to 111.0 degrees.

Additionally, in order for the reflected light to be accepted into core region 108 of optical fiber 107 and to be internally reflected by interface between core region 108 and cladding region 109, angle 140 or $\theta_T$ also fulfills the following equation:

$$\theta_T \geq 90° + 0.5(\sin^{-1}((n_1/n_3) \sin (90° - \sin^{-1}(n_2/n_1)))$$

with core region 108 of optical fiber 107 having a refractive index of 1.5 symbolized by $n_1$, with cladding region 109 of optical fiber 107 having a refractive index of 1.4 symbolized by $n_2$, and with first optical portion 135 having a refractive index of 1.5 symbolized by $n_3$, solving for angle 140 or $\theta_T$ results in angle 140 or $\theta_T$ being greater than or equal to 101.3 degrees. Thus, angle 140 ranges between 101.3 degrees and 111.0 degrees for this particular example.

Generally, first optical portion 135 and second optical portion 150 are made of a hard optically transparent polymer, such as polyimides, plastics, epoxies, polymers, or the like. However, in a preferred embodiment of the present invention, both first optical portion 135 and second optical portion 150 are made using an epoxy material. Refractive indexes of first optical portion 135 and second optical portion 150 range from 1.4 to 1.7; however, in a preferred embodiment of the present invention, refractive index of first optical portion 135 is at least 0.01 higher than second optical portion 150, thus efficiently and effectively guiding light from light emitting device 126 into core region 108 of optical fiber 107. Further, it should be understood, while FIG. 1 illustrates that first optical portion 135 totally encapsulates interconnect substrate 112, it is possible for interconnect board 112 not to be totally encapsulated by first optical portion 135.

Figure 2:
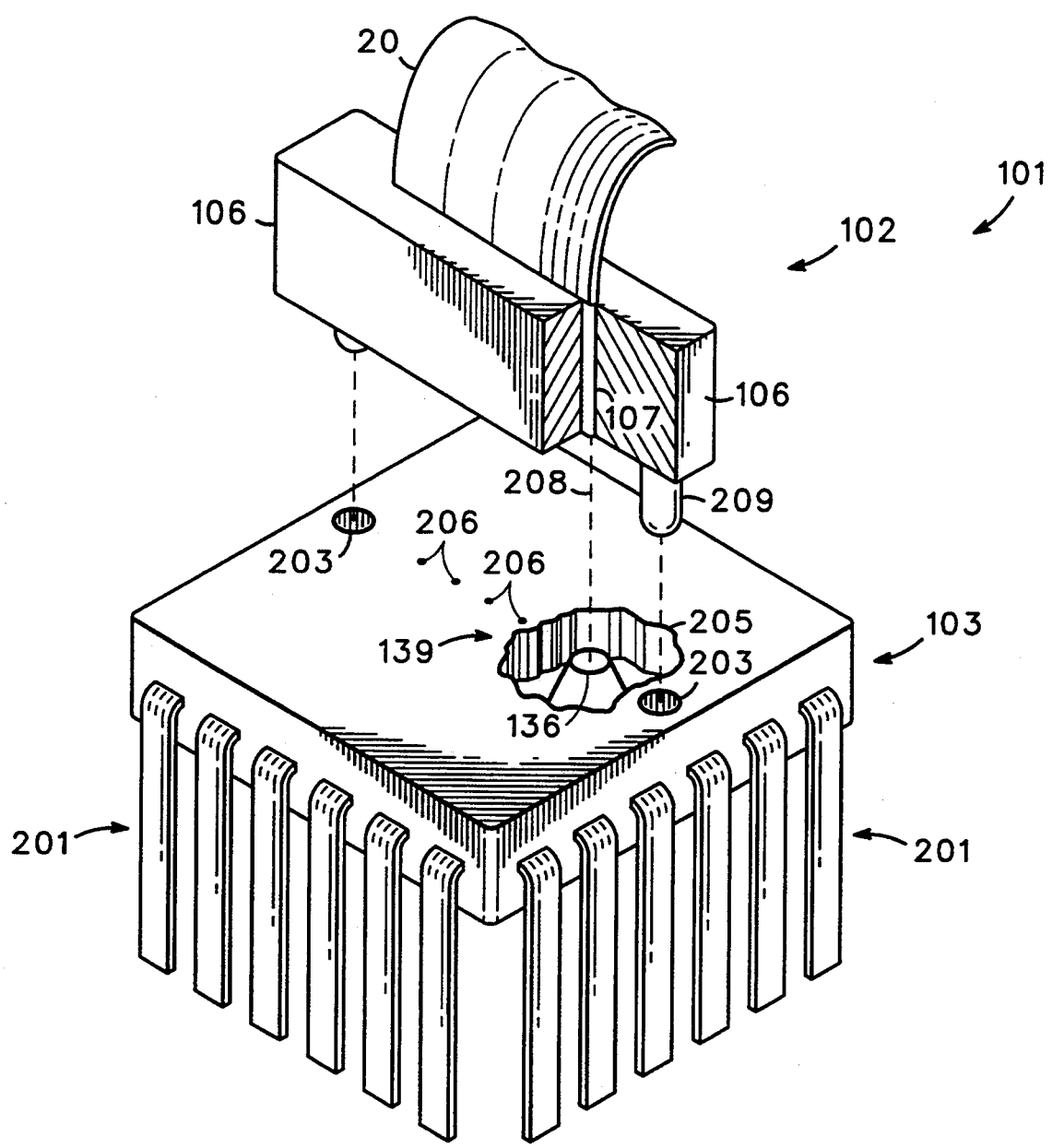
FIG. 2 is an enlarged simplified perspective view of a partially exploded optical interface unit, with a portion thereof removed.

FIG. 2 is an enlarged simplified perspective view of a partially exploded optical module 101 with portions thereof removed. Similar and identical features previously described in FIG. 1 will retain their original identifying numerals. In the present invention, optical module 101, including optical connector 102 and optical interface unit 103 are used to optically interconnect optical fiber 107 to light emitting device 126 (shown in FIG. 1) through guiding section 139. As can be seen in FIG. 2, a plurality of lead frame members 201 are readily discernible in this view. However, it should be understood by one of ordinary skill in the art that other electrical input and electrical output methods are capable of being used, such as a PGA, bump bonds, or the like as discussed hereinabove.

Removed portion 205 of optical interface unit 103 illustrates the conical configuration of light guiding structure 139. Additionally, it should be understood that a plurality of guiding structures 139, represented by dots labeled 206, are disposed in optical interface unit 103. It should be further understood that light guiding structures 139 are capable of being arranged in several different configurations, such as a single guiding structure and a single optical fiber, one dimensional array of guiding structures and optical fibers, and two dimensional areas of guiding structures and optical fibers. Specific location of guiding structures, illustrated by light guiding structure 139, is related to the positioning and configuration of optical fibers positioned in optical connector 102, thus providing a one-to-one correspondence between each optical fiber and each guiding structure. For example, optical fiber 107 is specifically guided to guiding structure 139 as illustrated by dashed line 208, thereby optically coupling optical fiber 107 to light emitting device 126 (not shown) through surface 136.

Alignment of optical connector 102 to optical interface unit 103 is achieved through using any suitable alignment method, such as pins, ferrules, keys, or the like. In a preferred embodiment of the present invention, optical connector 102 is made with alignment pins 209 and optical interface unit 103 is made with alignment ferrules 203, thus engaging alignment pins 209 with alignment ferrules 203 guides or aligns optical fibers housed in optical connector 102 to the plurality of guiding structures 139.

By now it should be appreciated that a novel method and article for interconnecting an optical fiber to a light emitting device has been described. The method and the article of the present invention allow for integration of optoelectronic components to standard electronic components in a cost effective and efficient manner by providing a way to eliminate costly manufacturing steps carried out by hand to automate several manufacturing steps. Further, in the present invention, the article enables integration easily into standard electronic manufacturing, thereby providing a cost effective and efficient means of integrating optoelectronic devices into standard electronic word manufacturing.

We claim:

1. An optical interface device comprising:
    an interconnect substrate having a plurality of electrical traces and a light emitting device with a working portion, the light emitting device mounted on the interconnected substrate to operably connect the light emitting device to one of the plurality of electrical traces; and
    a first optical portion having a first surface, a second surface, and a tapered surface extending therebetween, the first surface of the first optical portion overlying a portion of the interconnect substrate, the second surface of the first optical portion being positioned in overlying relationship to the working surface and parallel to and spaced with distance ranging from 2.0 millimeters to 200.0 millimeters from the working portion of the light emitting device, and the tapered surface extending from the second surface toward the working portion of the light emitting device for guiding light emitted from the working portion of the light emitting device to the first surface.

2. An optical interface device as claimed in claim 1 wherein the first optical portion is molded.

3. An optical interface device as claimed in claim 1 wherein the first optical portion has a refractive index ranging from 1.4 to 1.7.

4. An optical interface device as claimed in claim 1 further comprising a second optical portion having a first and a second surface with the first surface of the second optical portion being positioned on the tapered surfaces of the first optical portion.

5. An optical interface device as claimed in claim 1 wherein the tapered surfaces are tapered at an angle with the first surface ranging from greater than 90.0 degrees to 125.0 degrees.

6. An optical interface device as claimed in claim 5 wherein the tapered surfaces are tapered at an angle with the first surface ranging from 101.3 degrees to 111.0 degrees.

7. An optical interface device as claimed in claim 1 wherein the light emitting device is a laser.

8. An optical interface device as claim in claim 7 wherein the laser is a vertical cavity light emitting device.

9. An optical interface device as claimed in claim 1 wherein the light emitting device is a light emitting diode.

10. An optical unit comprising:
    an optical connector having an optical fiber having a core region, a cladding region, and a cross-sectional surface of the optical fiber, the cross-sectional surface of the optical fiber exposes a portion of a core region and a portion of a cladding region, the core region and the cladding region have refractive indexes of $n_1$ and $n_2$, respectively;
    an optical interface device including an interconnect substrate having a plurality of electrical traces, a light emitting device with a working portion operably connected to the plurality of electrical traces, a first optical portion with a refractive index of $n_3$, and a second optical portion with a refractive index of $n_4$, the first optical portion defines a first surface, a second surface, a tapering surface that extends therebetween, the first surface located parallel to the working portion of the light emitting device and the second surface located substantially parallel to the light emitting device; and an angle $\theta_T$ defined by the second surface and the tapered surface of the first optical portion, wherein the angle $\theta_T$ is determined by the following equation:

$$\theta_T \leq 180° - \sin^{-1}(n_4/n_3)$$

and wherein the acceptance angle $\theta_T$ of the core region of the optical fiber is determined by the following equation:

$$\theta_T \geq 90° + 0.5(\sin^{-1}((n_1/n_3)\sin(90° - \sin^{-1}(n_2/n_1)))).$$

11. An optical interface device comprising:
an interconnect substrate having a plurality of electrical traces and a light emitting device with a working portion, the light emitting device mounted on the interconnected substrate to operably connect the light emitting device to one of the plurality of electrical traces;
a first optical portion having a first surface, a second surface, and a tapered surface extending therebetween, the first surface of the first optical portion overlying the working portion of the light emitting device, the second surface of the first optical portion being positioned parallel to and spaced from the working portion of the light emitting device, and the tapered surface extending from the second surface toward the working portion of the light emitting device for guiding light emitted from the working portion of the light emitting device to the first surface; and
a second optical portion having a first surface and second surface with the first surface of the second optical portion positioned on the tapered surfaces of the first optical portion and the second surface of the second optical portion parallel to the second surface of the first optical portion.

12. An optical interface device as claimed in claim 11 wherein the first optical portion is molded.

13. An optical interface device as claimed in claim 11 wherein the first optical portion has a refractive index ranging from 1.4 to 1.7.

14. An optical interface device as claimed in claim 11 wherein the working portion of the light emitting device and the second surface of the first optical portion are separated by a distance ranging from 2.0 millimeters to 200.0 millimeters.

15. An optical interface device as claimed in claim 11 wherein the tapered surfaces are tapered at an angle with the first surface ranging from greater than 90.0 degrees to 125.0 degrees.

16. An optical interface device as claimed in claim 15 wherein the tapered surfaces are tapered at an angle with the first surface ranging from 101.3 degrees to 111.0 degrees.

17. An optical interface device as claimed in claim 11 wherein the light emitting device is a laser.

18. An optical interface device as claim in claim 17 wherein the laser is a vertical cavity light emitting device.

19. An optical interface device as claimed in claim 11 wherein the light emitting device is a light emitting diode.

20. A method for making an optical interface device comprising the steps of:
providing an interconnect substrate having a plurality of electrical tracings and a light emitting device with a working portion, the light emitting device mounted on the interconnected substrate to operably connect the light emitting device to one of the plurality of electrical traces; and
molding a first optical portion having a first surface, a second surface, and a tapered surface extending therebetween, the first surface of the first optical portion overlying the working portion of the light emitting device, the second surface of the first optical portion positioned parallel to and spaced from the working portion of the light emitting device, and the tapered surface extending from the second surface toward the working portion of the light emitting device for guiding light emitted from the working portion of the light emitting device to the first surface.

21. A method for making an optical interface device comprising the steps of:
providing an interconnect substrate having a plurality of electrical tracings and a light emitting device with a working portion, the light emitting device mounted on the interconnected substrate to operably connect the light emitting device to one of the plurality of electrical traces;
forming a first optical portion having a first surface, a second surface, and a tapered surface extending therebetween, the first surface of the first optical portion overlying the working portion of the light emitting device, the second surface of the first optical portion positioned parallel to and spaced from the working portion of the light emitting device, and the tapered surface extending from the second surface toward the working portion of the light emitting device for guiding light emitted from the working portion of the light emitting device to the first surface; and
forming a second optical portion having a first surface and second surface with the first surface of the second optical portion positioned on the tapered surfaces of the first optical portion and the second surface of the second optical portion parallel to the second surface of the first optical portion.

* * * * *